United States Patent [19]

Nagel

[11] Patent Number: 5,257,065
[45] Date of Patent: Oct. 26, 1993

[54] APPARATUS FOR TRANSPORTING EXPOSED PHOTOGRAPHIC FILMS THROUGH AND BEYOND A DEVELOPING UNIT

[75] Inventor: Erich Nagel, Anzing, Fed. Rep. of Germany

[73] Assignee: Agfa-Gevaert Aktiengesellschaft, Leverkusen, Fed. Rep. of Germany

[21] Appl. No.: 922,051

[22] Filed: Jul. 29, 1992

[30] Foreign Application Priority Data

Aug. 12, 1991 [DE] Fed. Rep. of Germany ....... 4126579

[51] Int. Cl.[5] ............................................. G03B 29/00
[52] U.S. Cl. ........................................ 355/28; 226/92; 352/235; 354/339; 355/50
[58] Field of Search .................... 352/235; 355/27-29, 355/50; 354/321, 339; 226/91, 92

[56] References Cited

U.S. PATENT DOCUMENTS

| | | | |
|---|---|---|---|
| 3,810,568 | 5/1974 | Kwiaikowski et al. | 226/92 |
| 4,004,724 | 1/1977 | Zangenfeind et al. | 226/91 |
| 4,096,020 | 6/1978 | Basu et al. | 156/519 |
| 4,110,774 | 8/1978 | Krehbiel et al. | 354/345 |
| 4,277,061 | 7/1981 | Nagel et al. | 271/302 |
| 4,297,027 | 10/1981 | Stemme et al. | 355/27 |
| 4,368,969 | 1/1983 | Baschung | 354/339 |
| 4,613,222 | 9/1986 | Takase | 354/321 |
| 4,864,354 | 9/1989 | Crasnianski | 355/27 |
| 5,015,089 | 5/1991 | Radon | 352/235 |
| 5,060,010 | 10/1991 | Ogura | 355/27 |

Primary Examiner—Richard A. Wintercorn
Attorney, Agent, or Firm—Peter K. Kontler

[57] ABSTRACT

Successive exposed photographic films are connected, either individually or in groups of two or more, to discrete sheet-like leaders which are transported along an elongated first path extending through the baths and the dryer of a developing unit. The leaders are separated from the respective webs downstream of the developing unit but upstream of a copying unit for developed films, and the separated leaders are directed into a second path to be gathered in a receptacle. The separation involves severing the leading end of each web close behind the respective leader, and the thus separated webs are caused to continue to advance along the first path through a magazine and thence into the copying unit. The severing mechanism includes a stationary first knife and a second knife which is movable relative to the first knife between a first position in which an oncoming leader is free to enter the second path and a second position in which the knives cooperate to sever the leading end of the web behind the leader in the second path.

18 Claims, 2 Drawing Sheets

APPARATUS FOR TRANSPORTING EXPOSED PHOTOGRAPHIC FILMS THROUGH AND BEYOND A DEVELOPING UNIT

CROSS-REFERENCE TO RELATED CASE

The apparatus of the present invention is similar to that which is disclosed in commonly owned copending patent application Ser. No. 922,049 filed Jul. 29, 1992 for "Apparatus for making prints of exposed and developed photographic films".

BACKGROUND OF THE INVENTION

The invention relates to apparatus for manipulating elongated webs which contain a photosensitive material and are to be processed in a laboratory wherein they advance first through a developing unit and thereupon through a copying unit. More particularly, the invention relates to improvements in apparatus which can be utilized with advantage for the development and copying of exposed photographic customer films in a processing laboratory.

Many amateur photographers, as well as numerous professionals, often desire to obtain developed photographic films, together with prints of all or selected exposed and developed film frames, without much delay. This has given rise to rapid spreading of establishments which specialize in instant service, e.g., in development, copying and printing of customer films within sixty minutes from the time of receipt of developed photographic films. Such establishments can be found in all or nearly all major cities as well as in numerous tourist centers, pilgrims' centers and even medium sized and smaller towns.

As a rule, an establishment which specializes in instant service will employ two machines, namely a developing unit for exposed photographic films and a miniature laboratory wherein a copying unit is combined with a developing unit for exposed photographic paper. Many establishments are set up in such a way that they can process wider or narrower exposed films as well as make smaller or larger prints on photographic paper or other suitable photosensitive material. Thus, it is already known to employ so-called leaders which are designed to be transported through a film developing unit and can entrain discrete films or plural films of various widths and/or lengths. The formats of all leaders are the same; this ensures that one and the same conveyor system can advance the leaders through the film developing machine irrespective of the number and or types of films which are being entrained by the leaders. The leaders are made of a material which can stand the corrosive and/or other influences of various baths in a film developing unit as well as the heating action in a dryer which normally follows the last bath in the developing unit. Reference may be had to U.S. Pat. No. 4,613,222 granted Sep. 23, 1986 to Takase et al. for "Film accumulating device for developing apparatus".

Attempts to further simplify and reduce the cost of processing of exposed films in an establishment specializing in instant service include the proposal to employ a single machine which can perform the film developing, copying and paper developing operations. In accordance with this proposal (reference may be had to U.S. Pat. No. 4,864,354 granted Sep. 5, 1989 to Crasnianski for "Integrated automatic machine for simultaneously and continuously effecting the development of photographic films and the printing and development of photographic prints"), the single machine employs a film developing unit which does not utilize any leaders. This simplifies the manipulation of films and the making of prints in certain ways but detracts from the versatility because the film transporting mechanism is designed to advance only films of a particular type, e.g., the popular 135 roll films. Consequently, establishments which employ machines of the type disclosed by Crasnianski can accept only one format of films for one-hour service.

OBJECTS OF THE INVENTION

An object of the invention is to provide an apparatus which is constructed and assembled in such a way that it can develop photographic roll films of all or nearly all popular formats.

Another object of the invention is to provide an apparatus which can develop roll films of several formats and can also image the frames of exposed and developed films onto sheets of photographic paper or the like irrespective of the formats of the developed films.

A further object of the invention is to provide an apparatus which can be utilized with advantage in establishments specializing in instant service involving the development of exposed customer films and the making of prints having a desired size and/or shape.

An additional object of the invention is to provide the apparatus with novel and improved means for controlling the movements of leaders for exposed films in and beyond the film developing unit.

Still another object of the invention is to provide a versatile apparatus wherein the leaders can be reused as often as desired and wherein the leaders are not damaged or destroyed during separation from films which were entrained thereby through and, if necessary, beyond the film developing unit.

A further object of the invention is to provide a novel and improved method of rapidly developing exposed photographic customer films and of making prints of desired size and/or shape within periods of time which are expected in establishments specializing in the aforediscussed instant service.

Another object of the invention is to provide the apparatus with novel and improved means for separating leaders from freshly developed photographic roll films.

An additional object of the invention is to provide the apparatus with novel and improved means for gathering leaders for exposed photographic roll films.

Still another object of the invention is to provide the apparatus with novel and improved means for manipulating leaders and photographic films between the film developing and film copying units.

A further object of the invention is to provide a compact apparatus which can manipulate numerous formats of films and can turn out numerous formats of high-quality photographic prints.

SUMMARY OF THE INVENTION

The invention is embodied in an apparatus for processing successive exposed webs of the type containing a photosensitive material and having leading ends. The improved apparatus comprises a developing unit, a copying unit, and means for transporting successive webs in a predetermined direction along an elongated first path first through the developing unit and thereupon into the copying unit. The transporting means comprising substantially sheet-like leaders which are connectable to the leading ends of successive webs, means for advancing the leaders and the respective webs along a first portion of the first path through the developing unit, means for separating the leaders from the leading ends of the respective webs in a second portion of the first path downstream of the first portion and upstream of the copying unit, and means for conveying separated leaders along a second path.

The developing unit normally includes a succession of baths, and the advancing means of the transporting means includes means for advancing the leaders and the respective webs through the succession of baths.

The apparatus further comprises a guide which is disposed at the second portion of the first path. The guide is movable between a first position in which a leader is free to enter the second path and a second position in which the freshly separated leading end of a web is compelled to advance along and beyond the second portion of the first path.

The separating means can include a knife on the guide. In accordance with a presently preferred embodiment, the guide is pivotable between the first and second positions about a predetermined axis, preferably about in axis which is normal or substantially normal to the predetermined direction. The knife can be separably affixed to the guide.

The apparatus can further comprise means for collecting the separated leaders in a predetermined portion of the second path. Such collecting means can comprise a receptacle for separated leaders.

Still further, the apparatus can comprise a magazine for temporary storage of separated webs in a third portion of the first path downstream of the second portion of the first path; such magazine is located upstream of the copying unit.

At least one of the first and second paths will normally include one or more arcuate sections.

The means for conveying separated leaders can comprise at least one stationary guide (e.g., a stationary wall having a concave surface confronting a leader which is in the process of entering the second path) for separated leaders.

At least one of the advancing and conveying means can comprise at least one pair of driven rolls defining at least one nip for the leaders.

The apparatus can further comprise means for advancing separated webs along a third portion of the first path downstream of the second portion, e.g., into the aforementioned magazine or into the copying unit.

The separating means preferably includes means for severing the leading ends of successive webs. Such severing means can include a stationary first knife and a second knife which is movable with reference to the first knife between a first position in which a leader is free to leave the second portion of the first path and to enter the second path, and a second position in which the knives cooperate to sever the leading end of a web which is still connected to a leader that has already entered the second path.

The leaders can be made of a flexible plastic material which is not affected by various baths during advancement along the first portion of the first path. The second portion of the first path can be oriented to guide the leaders and the respective webs from a lower level to a higher level.

Another feature of the invention resides in the provision of a method of processing successive exposed webs which contain a photosensitive material and each of which has a leading end and a trailing end, for example, exposed photographic roll films. The method comprises the steps of affixing the leading end of each web of the aforementioned successive webs to a discrete sheet-like flexible leader and utilizing the leaders to transport the respective webs in a predetermined direction along a first path first through a developing unit and thereupon toward or into a copying unit. The transporting step includes advancing the leaders and the respective webs along a first portion of the first path through the developing unit, separating the leaders from the leading ends of the respective webs in a second portion of the first path downstream of the first portion and upstream of the copying unit, and conveying the separated leaders along a second path, e.g., into a receptacle whence the leaders can be withdrawn, either by hand or automatically, for attachment to discrete webs or to groups (e.g., pairs) of discrete webs.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
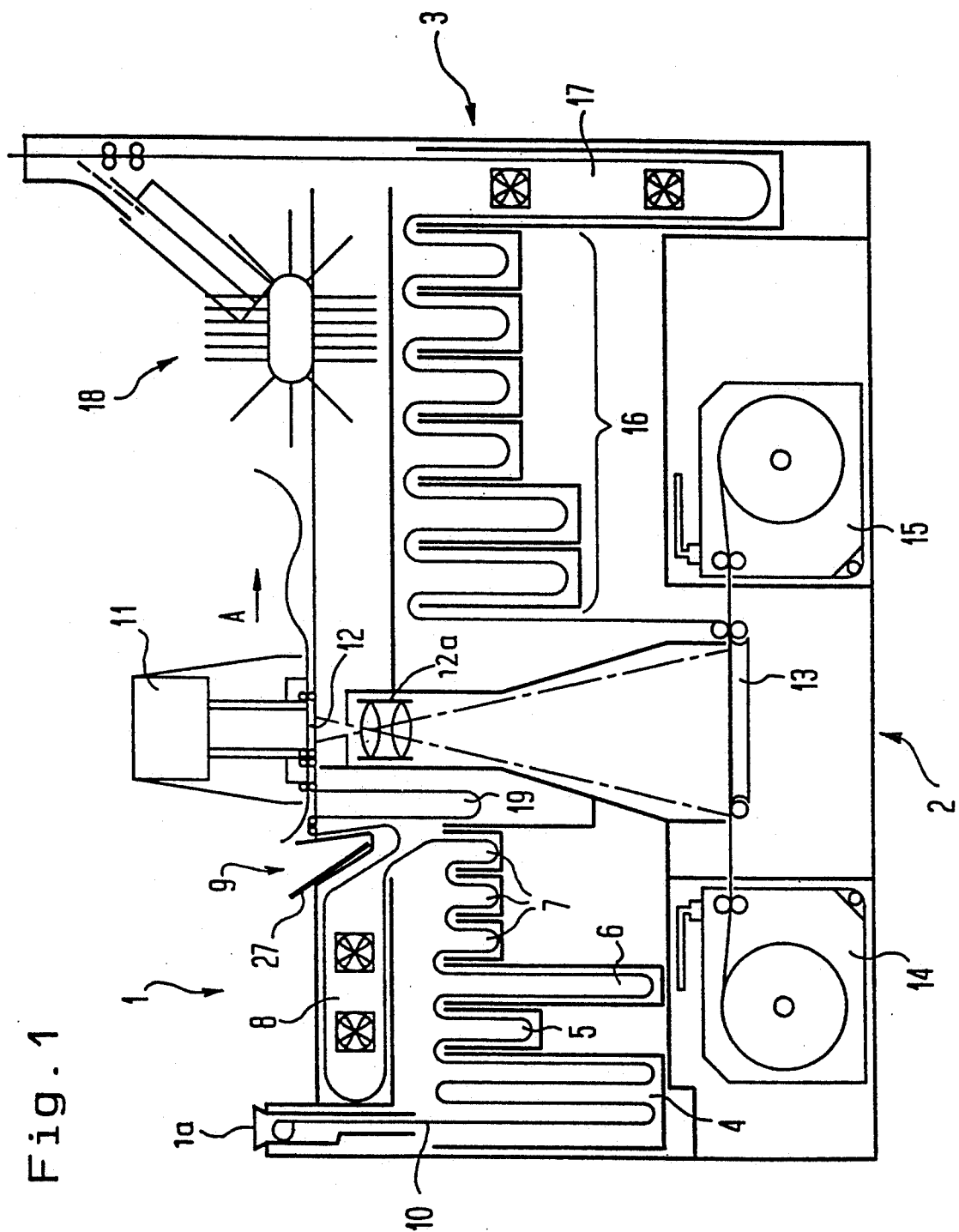
FIG. 1 is a schematic vertical sectional view of an apparatus which embodies one form of the invention and wherein exposed photographic customer roll films are developed, their frames imaged onto sheets of photographic paper and the sheets exposed in a time- and space-saving manner.

FIG. 1 shows a processing laboratory which can complete all operations starting with the introduction (at 1a) of a discrete exposed film 10 or with simultaneous introduction of two or more exposed films 10 and ending with the discharge of a set or stack of exposed and developed photographic prints into a collating unit 18. The laboratory comprises a developing unit 1 for webs 10 (i.e., for exposed photographic roll films), a copying unit 2 wherein all (or selected) film frames are imaged onto sheets of photographic paper, and a developing unit 3 for exposed sheets of photographic paper. The developing unit 1 comprises a series of tanks for a developing bath 4, a first rinsing bath 5, a fixing bath 6 and a final rinsing bath 7. A film 10 which has advanced through the baths 4 to 7 enters into and advances through a dryer 8 prior to entering a station 9 where a so-called leader 27 (one shown in FIG. 2) is separated from the leading end(s) of the respective film(s) 10 but the freshly developed film or films 10 are caused to continue to advance along their elongated (first) path in the direction of arrow A toward and into the copying unit 2.

The copying unit 2 comprises one or more radiation sources 11 above a platform 12 for successive frames of a film 10, an objective 12a (e.g., a zoom lens) beneath the platform 12, and a platform 13 beneath the objective 12a for discrete sheets of photographic paper or other suitable photosensitive material. Sheets of photographic paper are supplied by a first cassette 14 or by a second cassette 15, depending upon the desired format of the prints. This is fully described, shown and claimed in the aforementioned commonly owned copending patent application Ser. No. 922,049 for "Apparatus for making prints of exposed and developed photographic films".

The developing unit 3 comprises a series of baths 16 for exposed sheets of photographic paper, a dryer 17 for developed sheets, and the aforementioned collating unit 18 which gathers prints belonging to a particular film 10 or to a particular set of films. Such prints and the respective film or films can be handed or mailed to customers in suitable envelopes in a manner which is well known in the art.

In order to be reliably transported through the developing unit 1, a film 10 (or two or more films 10) must be affixed to a leader 27. Attachment (e.g., bonding) of the leading end or ends of one or more exposed films 10 to a leader 27 can be carried out by hand or automatically in a manner not forming part of the invention. The leader 27 forms part of a system which serves to transport films 10 through the baths 4–7, dryer 8 and station 9 toward or all the way into the copying unit 2. The advancing means engages a leader 27 but not the film or films 10 which are affixed to the leader; therefore, such advancing means can transport one or more wider, narrower, shorter or longer films 10 to thus contribute to versatility of the improved apparatus.

Each leader 27 is separated from the leading end or ends of the attached film or films 10 at the station 9 to leave the (first) path for the film or films and to enter a second path 23 leading into a collecting or intercepting receptacle 26 which is capable of temporarily storing a selected number of leaders 27. The thus freed leading end or ends of one or more freshly developed films 10 continue to advance along the first path to enter a magazine 19 and to be conveyed onto the platform 12 in the copying unit 2. All such operations are carried out without the need for any manual work, i.e., without any assistance from one or more attendants.

The purpose of the magazine 19 is to compensate for differences between the rate of developing successive film frames in the developing unit 1 and the rate of imaging of successive developed film frames onto sheets of photographic paper in the copying unit 2. One or more scanners (not shown) are provided at or ahead of the copying unit 2 to ascertain certain important characteristics of successive film frames while a film is being advanced in the direction of arrow A, and the thus obtained information is thereupon used to properly image each frame onto a sheet of photographic paper on the platform 13 while the scanned film is caused to advance counter to the direction which is indicated by the arrow A. The manner of gathering information which is needed for copying, of processing such information, and of using processed information to image film frames onto photographic paper forms no part of the present invention.

The cassette 14 contains a supply of convoluted photographic paper having a first width, and the cassette 15 contains a supply of convoluted photographic paper having a different second width. This renders it possible to furnish at least four different formats of prints for reasons and in a manner as described shown and claimed in the aforementioned copending patent application Ser. No. 922,049. The leader of a convoluted strip of paper which is stored in the cassette 14 or 15 can be drawn from the respective cassette to be thereupon cut away from the remainder of the stored strip and to have its orientation changed (if necessary) prior to exposure to light issuing from the source 11 and passing through a film frame on the platform 12 and through the objective 12a of the copying unit 2. Freshly exposed sheets are introduced into the developing unit 3 to advance through the series of baths 16, the dryer 17 and into the collating unit 18 at the outlet of the unit 3. The collating unit 18 can stack the prints belonging to a developed film 10 or to a particular customer for convenient introduction into envelopes or the like.

Figure 2:
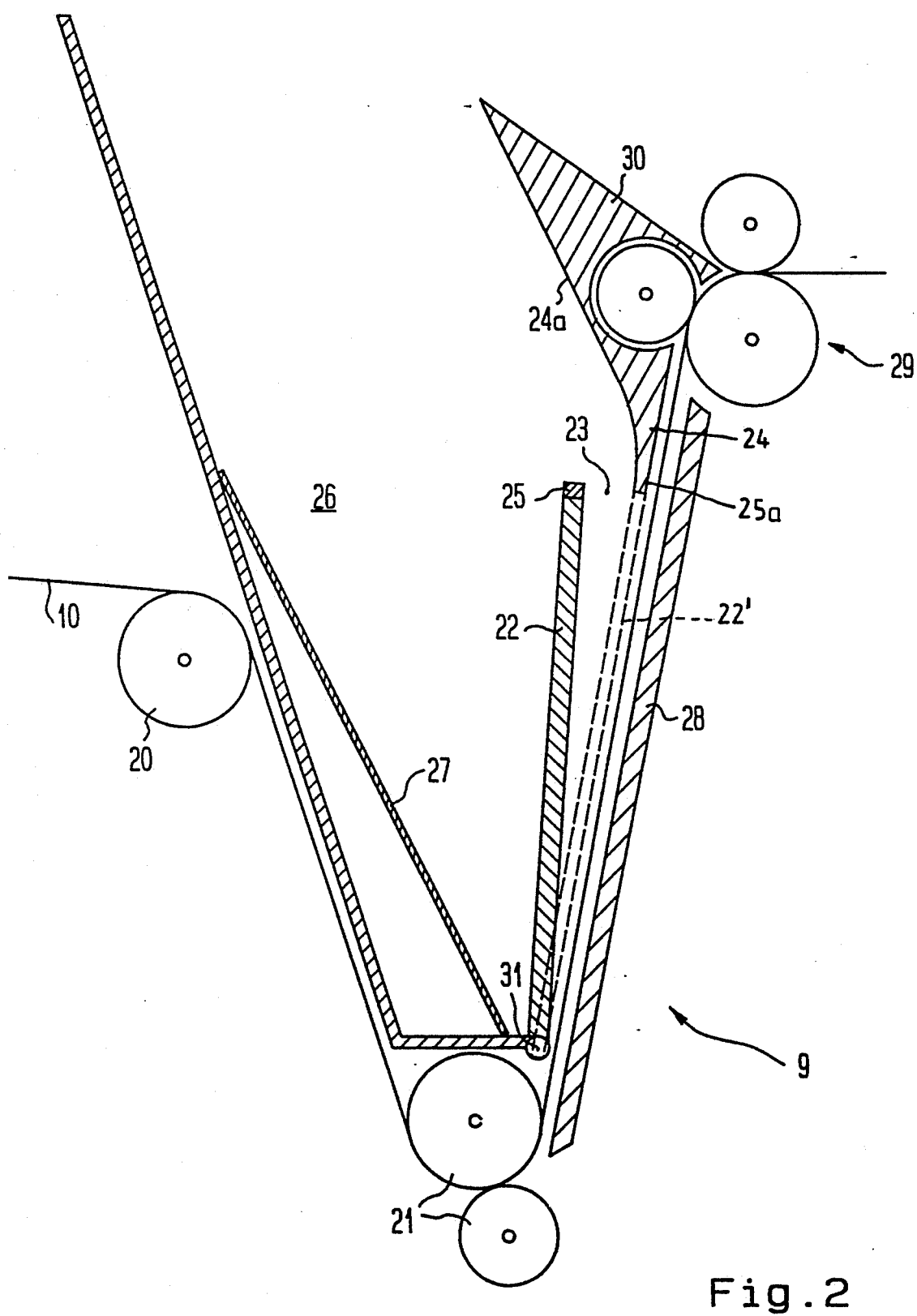
FIG. 2 is a greatly enlarged partly elevational and partly vertical sectional view of a detail in the apparatus of FIG. 1.

A portion of the (first path) for exposed photographic films 10 and the respective leaders 27 is shown in FIG. 2. Thus, a film 10 whose leading end is affixed to a leader 27 is caused to advance around a roller 20 at the outlet of the dryer 8 and to thereupon enter the nip of two advancing rolls 21 at least one of which is driven to advance a leader 27 and hence the corresponding exposed and developed film or films 10 from a lower level to a higher level. The means for advancing the leaders 27 along a first portion of the first path (such first portion can be said to terminate at the nip of the advancing rolls 21) and thereupon into a second portion immediately downstream of the first portion is not shown in the drawing; the advancing means is or can be the same as that described and shown in U.S. Pat. No. 4,613,222 to Takase et al. and, therefore, the disclosure of this patent is incorporated herein by reference.

The second portion of the first path is adjacent a mobile guide 22 which, in turn, is adjacent a stationary wall 28 leading the films 10 upwardly into the nips of a set of rolls 29 serving to convey the films into the magazine 19. The guide 22 is pivotable adjacent a stationary wall or guide 24 between a first position (shown in FIG. 2 by solid lines) in which the guide 22 permits a leader 27 to leave the second portion of the first path and to enter the second path 23 which leads into the receptacle 26, and a second position 22' (shown by broken lines in which the second path 213 is closed or sealed from the second portion of the first path. Consequently, a film 10 which has been separated from the respective leader 27 as a result of pivoting of the guide 22 to the broken-line position 22' is compelled to remain in and to advance beyond the second portion of the first path, namely into the nips of the rolls 29 which convey the film into the magazine 19. The film 10 which has been separated from its leader 27 continues to advance along the stationary wall 28 and toward the rolls 29 because at least one of the rolls 21 is driven in a direction to advance the film toward the rolls 29.

The rolls 21 are temporarily arrested (e.g., in response to a signal from a photocell or another suitable sensor) as soon as the entire leader 27 has entered the second path 23. The signal from such sensor then initiates automatic pivoting of the guide 22 from the solid-line position to the broken-line position 22' of FIG. 2 so that the film or films 10 are severed immediately behind the leader 27 and the latter can be transported by its advancing means along the concave surface 24a of the wall 24 into the receptacle 26 to be ready for renewed use, i.e., for attachment to the leading end or ends of one or more freshly supplied exposed but undeveloped customer films 10.

The guide 22 is pivotable about the axis of a horizontal shaft or pintle 31 which is normal to the direction of advancement of films 10 through the developing unit 1. Once the guide 22 assumes the position 22', it cooperates with the stationary wall 28 to define a narrow passage for advancement of one or more exposed and developed films 10 toward the conveying rolls 29 as soon as the rolls 21 are again set in rotary motion. The guide 22 can automatically reassume the solid-line position as soon as the leader of a film adjacent the wall 28 enters the first nip of the rolls 29. This enables the next leader 27 to enter the second path 23.

The illustrated severing or cutting mechanism includes a stationary counterknife 25a on the wall 24 and a knife 25 which is preferably separably affixed to the upper end portion of the guide 22, i.e., at a location remote from the pivot axis which is defined by the shaft 31. The knives 25 and 25a cooperate to sever one or more films 10 immediately behind the respective leader 27, i.e., to sever that portion or those portions of one or more films which do not bear any images and are normally provided on photographic roll films in order to facilitate threading into the transporting mechanism of a photographic camera.

FIG. 2 further shows a slide or chute 30 which serves to facilitate introduction of discrete film frames or short series of film frames into the second nip of the rolls 29. Such discrete film frames or short series of film frames are advanced onto the platform 12 to be imaged onto sheets of photographic paper on the platform 13. Furthermore, the chute 30 facilitates introduction of one or more full-length roll films which were developed in a machine other than the developing unit 1 so that they need not be introduced at the inlet 1a to pass through the baths 4–7 and dryer 8.

An important advantage of the improved apparatus including the parts at the station 9, the developing unit 1 and the copying unit 2 is that the apparatus can employ leaders 27. Thus, the developing unit 1 can treat films of different formats, as long as such films can be secured to leaders 27 which advance them through the developing unit 1.

Another important advantage of the improved apparatus is that a leader 27 is automatically separated from the adjacent film or films 10, and the separated leader is automatically introduced into the receptacle 26 for renewed use or for other disposition. The mechanism which is used to advance a leader 27 through the developing unit 1 is used to thereupon compel the leader to enter the receptacle 26. This simplifies the construction and the mode of operation of the improved apparatus.

An additional important advantage of the improved apparatus is that, since the leaders 27 are automatically separated from the respective exposed and developed films 10, such films can be treated in a simple and compact copying unit 2 which is preferably designed to image the frames of many types of exposed and developed photographic films.

It is equally within the purview of the invention to employ a separating or severing device which need not have any of its parts mounted on the mobile guide 22 and is activated in response to entry of an entire leader 27 into the second path 23. However, the illustrated separating or severing device is preferred at this time because it is not necessary to provide a discrete moving means for the mobile knife 25. Moreover, the severing action can be fully synchronized with introduction of a leader 27 into the second path 23 by the simple expedient of monitoring the trailing end of a leader and of causing a servomotor, an electromagnet or any other suitable part to automatically pivot the guide 22 to the position 22' as soon as the signal from the monitoring means indicates that the trailing end of a leader 27 has entered the second path 23. The length of the guide 22 (as seen in the direction of advancement of films 10 toward the rolls 29) can equal or approximate the length of a leader 27.

the rolls 21 are preferably arrested at least while the guide 22 completes the last stage of its pivotal movement toward the position 22', i.e., the freshly developed film or films 10 are severed immediately behind the respective leader 27 while the leader is at a standstill. The freshly separated leader 27 can descend into the receptacle 26 by gravity or it can be positively advanced along the second path 23 beyond that position which it assumes during separation from the adjacent film or films 10. As mentioned above, the guide 22 can return to the solid-line position of FIG. 2 as soon as or shortly after a severing or separating step is completed. This ensures that the transporting system of the improved apparatus can immediately proceed with the advancement of the next leader 27 and of the corresponding film or films 10 toward the guide 22. More specifically, the guide 22 preferably returns to the solid-line position of FIG. 2 as soon as the leading end or ends of the freshly separated film or films 10 advance beyond the stationary knife 25a, i.e., as soon as such leading end or ends are no longer likely to enter the second path 23 by passing through the window of the stationary guide wall 24.

The capacity of the magazine 19 is preferably selected in such a way that the magazine can store at least one standard roll film of average length.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for processing successive exposed webs containing a photosensitive material and having leading ends, comprising a developing unit; a copying unit; and means for transporting successive webs in a predetermined direction along a first path first through said developing unit and thereupon into said copying unit, said transporting means comprising substantially sheet-like leaders connectable to the leading ends of successive webs, means for advancing the leaders and the respective webs along a first portion of said first path through said developing unit, means for separating the leaders from the leading ends of the respective webs in a second portion of said first path downstream of said first portion and upstream of said copying unit, and means for conveying separated leaders along a second path.

2. The apparatus of claim 1, wherein said developing unit includes a succession of baths and said advancing means includes means for advancing the leaders and the respective webs through said succession of baths.

3. The apparatus of claim 1, further comprising a guide at said second portion of said first path, said guide being movable between a first position in which a leader is free to enter said second path and a second position in which the freshly separated leading end of a web is compelled to advance along and beyond said second portion of said first path.

4. The apparatus of claim 3, wherein said separating means includes a knife on said guide.

5. The apparatus of claim 4, wherein said guide is pivotable between said positions about a predetermined axis.

6. The apparatus of claim 4, wherein said knife is separably affixed to said guide.

7. The apparatus of claim 1, further comprising means for collecting the separated leaders in a predetermined portion of said second path.

8. The apparatus of claim 7, wherein said collecting means comprises a receptacle for separated leaders.

9. The apparatus of claim 1, further comprising a magazine for separated webs in a third portion of said first path downstream of said second portion.

10. The apparatus of claim 9, wherein said magazine is located upstream of said copying unit.

11. The apparatus of claim 1, wherein at least one of said paths includes at least one arcuate section.

12. The apparatus of claim 1, wherein said conveying means includes at least one stationary guide for separated leaders.

13. The apparatus of claim 1, wherein at least one of said advancing and conveying means comprises at least one pair of driven rolls defining a nip for the leaders.

14. The apparatus of claim 1, further comprising means for advancing separated webs along a third portion of said first path downstream of said second portion.

15. The apparatus of claim 1, wherein said separating means includes means for severing the leading ends of successive webs.

16. The apparatus of claim 15, wherein said severing means includes a stationary first knife and a second knife movable with reference to said first knife between a first position in which a leader is free to leave said first path and enter said second path and a second position in which said knives cooperate to sever the leading end of a web connected to a leader in said second path.

17. The apparatus of claim 1, wherein said leaders consist of flexible plastic material.

18. The apparatus of claim 1, wherein said second portion of said first path is oriented to guide the leaders and the respective webs from a lower level to a higher level.

* * * * *